United States Patent
Henderson et al.

Patent Number: 5,670,962
Date of Patent: Sep. 23, 1997

[54] TRANSMIT POWER CONTROL FOR AUTOMOTIVE RADAR SYSTEM

[75] Inventors: Mark Ford Henderson; William Lloyd Piper, both of Kokomo, Ind.

[73] Assignee: Delco Electronics Corp., Kokomo, Ind.

[21] Appl. No.: 558,124

[22] Filed: Nov. 13, 1995

[51] Int. Cl.$^6$ .................................................. G01S 13/62
[52] U.S. Cl. .................................. 342/70; 342/82; 342/84
[58] Field of Search ......................... 342/70, 71, 72, 342/61, 69, 73, 82, 84, 88

[56] References Cited

U.S. PATENT DOCUMENTS

| | | | |
|---|---|---|---|
| 3,786,507 | 1/1974 | Hurd, Jr. | 343/7 |
| 3,898,652 | 8/1975 | Rashid | 343/6 |
| 4,011,563 | 3/1977 | Robbi | 343/7 |
| 4,217,582 | 8/1980 | Endo et al. | 343/7 |
| 4,465,155 | 8/1984 | Collins | 342/70 X |
| 4,467,313 | 8/1984 | Yoshino et al. | 340/904 |
| 4,641,136 | 2/1987 | Kowalczyk | 340/903 |
| 4,807,101 | 2/1989 | Milde, Jr. | 362/276 |
| 5,162,794 | 11/1992 | Seith | 340/903 |
| 5,166,681 | 11/1992 | Bottesch et al. | 340/933 |
| 5,266,955 | 11/1993 | Izumi et al. | 342/71 |
| 5,302,956 | 4/1994 | Asbury et al. | 342/70 |
| 5,313,201 | 5/1994 | Ryan | 340/961 |
| 5,314,037 | 5/1994 | Shaw et al. | 180/169 |
| 5,325,097 | 6/1994 | Zhang et al. | 342/71 |
| 5,508,706 | 4/1996 | Tsou et al. | 342/192 |
| 5,529,138 | 6/1996 | Shaw et al. | 180/169 |

FOREIGN PATENT DOCUMENTS

| | | |
|---|---|---|
| 58-28678 | 2/1983 | Japan. |
| 28 18 770A | 10/1979 | Netherlands. |
| 2073533 | 3/1981 | United Kingdom ............ G01S 13/62 |

*Primary Examiner*—John B. Sotomayor
*Attorney, Agent, or Firm*—Mark A. Navarre

[57] ABSTRACT

A radar system for detecting hazardous objects has a transceiver including a transmitting antenna for transmitting microwave power. For a side detection system, power transmission is available when the vehicle is moving forward. A signal processor receives a pulsed vehicle speed signal and a reverse signal and is programmed to terminate transmission when no speed pulse is received for a preset time or when the reverse signal is present. The transmission is terminated by removing power from the transceiver or by rerouting the microwave power from the antenna to an internal calibration circuit. Radar transmission is re-enabled when the vehicle begins to move forward again. For a rear detection system, radar transmissions are enabled when the reverse signal is present.

13 Claims, 2 Drawing Sheets

TRANSMIT POWER CONTROL FOR AUTOMOTIVE RADAR SYSTEM

FIELD OF THE INVENTION

This invention relates to the control of automotive radar transmission and particularly to a method and apparatus for turning off such transmission when not needed.

BACKGROUND OF THE INVENTION

Vehicle mounted near object detection systems utilize various means for detecting and identifying targets of interest in their vicinity. The target information is useful in collision warning systems wherein the system notifies the vehicle operator that an object is positioned to present collision potential. While many forms of near object detection systems presently exist, generally those utilizing radar transceivers and related signal processing techniques do the best job of reliably detecting targets within range over variations in environment.

Such near object detection systems use radar, preferably microwave radar, to "illuminate" a target of interest by transmitting energy with certain signatory characteristics and then monitoring for similar return signals reflected from an object. Microwave transmissions with approved power levels and spectra generally experience lower overall attenuation with weather and are less susceptible to "scattering" effects than are other transmission media utilized by systems of this type. Properties of the reflected signal are analyzed using established (proprietary) techniques to determine relevance to the interests of the driver of a vehicle equipped with such a system. Information derived from the returned radar signals include target range and range rate. Using platform vehicle speed as a system input and as a reference, target data can be analyzed and the signal processor can make reasonable decisions whether to "report" the target or not. Accurate target discrimination capabilities are required of such systems to reduce "false alarms" which are an annoyance to the driver in collision warning system scenarios.

Generally it is desirable that such systems only transmit power when genuinely required. If a vehicle having a near object detection system is started and running, but not moving, transmitting power serves no real benefit since the vehicle operator is not then capable of either causing or preventing a collision. In particular, when the vehicle is stationary for a long time, as when stopped for traffic congestion, when idling waiting for a passenger, or when a truck is idling overnight in a parking lot while its operator rests inside, the transmission of power will do no good; at the same time, the system could detect nearby moving vehicles and create annoying false alarms.

SUMMARY OF THE INVENTION

It is therefore an object of the invention in a vehicular near object detection system to terminate transmission of radar energy during long periods when the vehicle is stationary.

Vehicle speed signals are produced for use in vehicle systems including near object detection systems. In particular, certain side detection systems have the vehicle speed signal present to service the target discriminator algorithms. The speed signal comprises a series of pulses, each pulse representing an increment of vehicle motion or of wheel rotation.

By providing the object detection system with the vehicle speed signal, a signal processor having software for determining from the speed signal when the vehicle is stationary for a prescribed time, and a switchable power supply subject to the signal processor, the power can be removed from the transceiver or from the transmitter portion of the transceiver to terminate the power transmission when the vehicle is stationary for a time. The same software detects when the vehicle begins moving to then cause the power supply to restore the power transmission. Alternatively, the power may be routed through a calibration impedance or "dummy load" to minimize transmitted energy while maintaining the transceiver components in stable operation.

A time delay from several seconds to several minutes is chosen as a minimum stop time to disable the transmission. This prevents the disabling for short stops, as at a stop light, for example. The software monitors the vehicle speed pulses and periodically increments a timer when there are no pulses. When the timer value exceeds the chosen delay time the power supply is commanded to disable transmission, e.g., by turning off power to the transmitter. When the software detects a pulse, the timer is reset to zero and transmission is enabled (if it had been disabled).

Further, by providing the system with a signal indicating reverse motion, the transmission of power is terminated when a reverse signal is present. While the system is primarily for side object detection, a similar system may be used for rear object detection. In that case the reverse signal is used to enable the rear system.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

The ensuing description is directed to an object detection method and apparatus having both side detection and rear detection. It should be understood that the primary system is the side detection system and that a separate rear detection system may be considered to be an option. Even though the description details both types, it will be apparent that the rear detection elements may be omitted without disruption of the side detection function.

Figure 1:
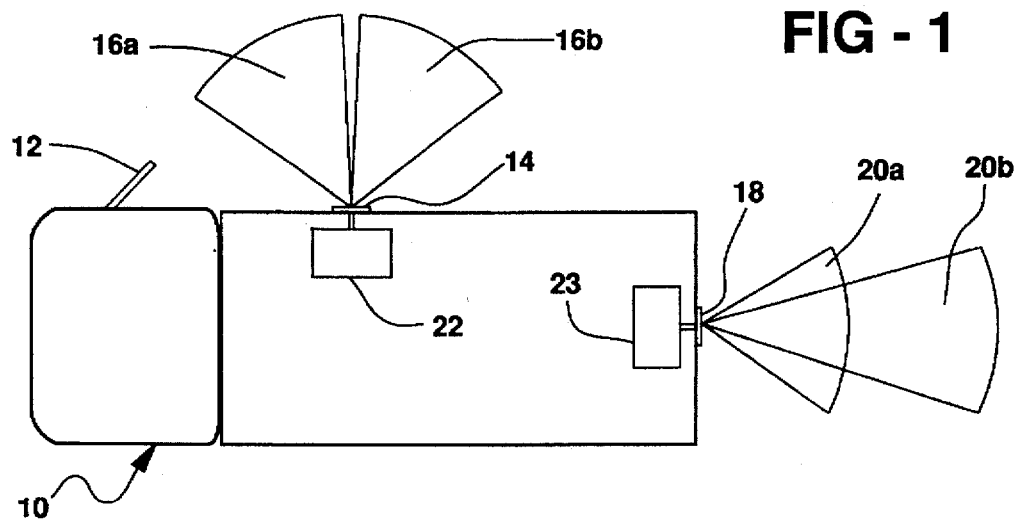
FIG. 1 is a schematic top view of a vehicle equipped with object detection systems.

Referring to FIG. 1, a motor vehicle 10, in particular a large truck, has a side view mirror 12, side detection radar antennae 14, and rear detection antennae 18. The antennae 14 and 18 are parts of a side detection system 22 and a rear detection system 23, respectively. Side detection antennae 14 are effective to view a region 16a to the side and forward of side detection system 22 and to simultaneously view region 16b to the side and behind side detection system 22. The side view mirror 12 provides a limited view of the lane adjoining the lane used by the vehicle, leaving the possibility that an object is present in a blind spot. Similarly, rear detection antennae 18 are effective to view separate yet overlapping regions 20a and 20b directly behind the vehicle, where side view mirror 12 provides little benefit. Weather conditions may also impair visibility.

To supplement the mirror view, when the vehicle is traveling forward the side detection system 22 senses the presence of an object in the adjoining lane via radar signals transmitted and received at the side antennae 14. The system warns the operator of such objects by warning lamps which may be on or within the mirror 12 and/or by an audible signal. In the same way the system 23 uses the rear antennae 18 to monitor the area at the rear of the vehicle when it is in reverse and/or traveling in reverse and to provide a warning in the same manner. When the vehicle is stopped with the engine running for more than a few minutes (as determined by a program), all radar transmission is terminated.

Figure 2:
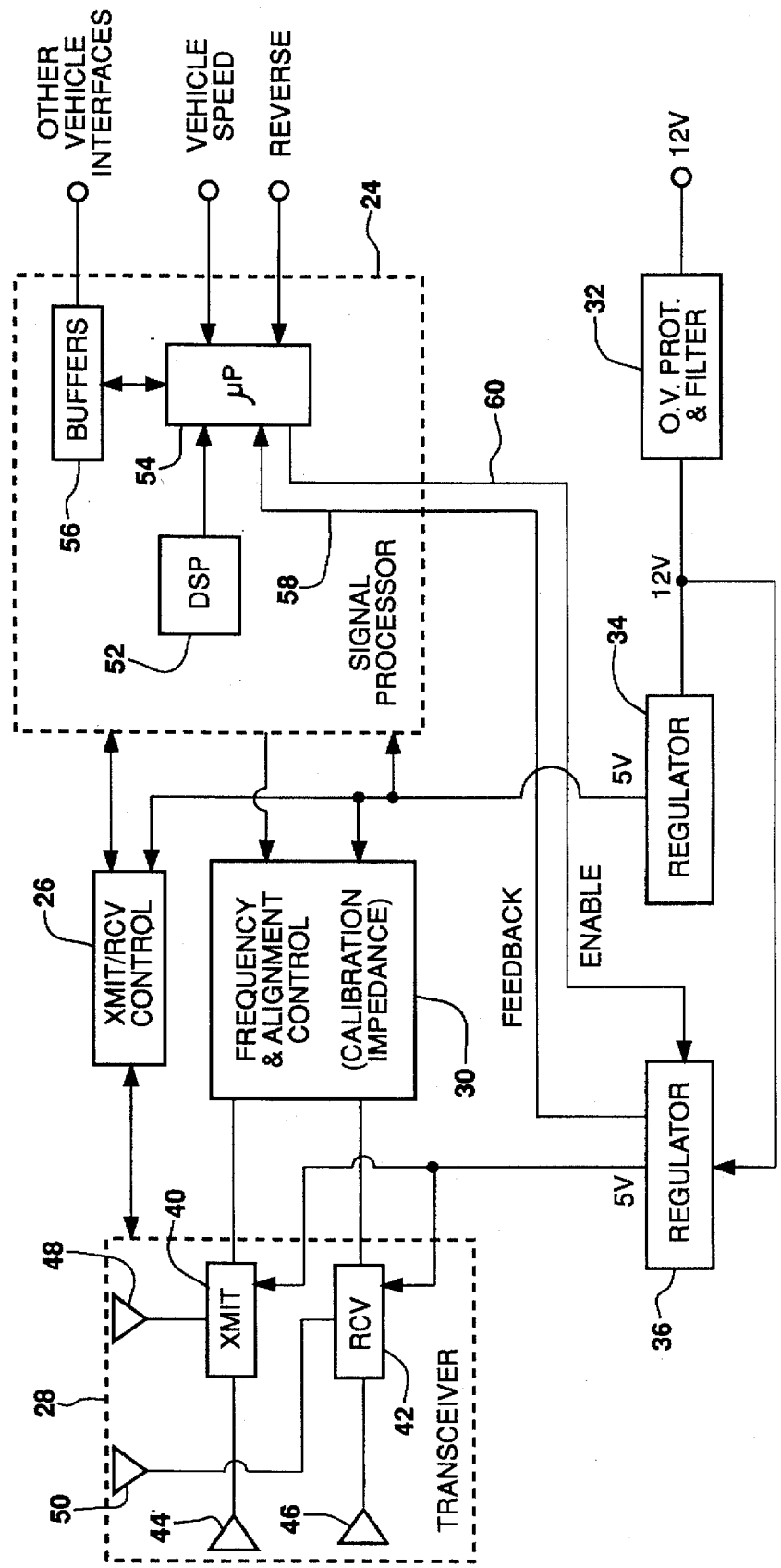
FIG. 2 is a schematic diagram of an object detection system according to the invention.

While antennae patterns may differ by application, FIG. 2 represents a schematic design germane to either a side detection system 22 or a rear detection system 23. A signal processor 24 is coupled via a transmit/receive control 26 to a transceiver 28 so that the signal processor 24 can control the transmission and can also receive data generated by the transceiver 28. A frequency and alignment control 30 is coupled to the transceiver 28 and is controlled by the signal processor 24 for calibrating the transceiver. The control 30 may contain a calibration impedance. A power supply includes an overvoltage protection circuit and filter 32 supplied by 12 volts from the vehicle and which produces filtered 12 volts. A first regulator 34 supplied by the filtered 12 volts supplies 5 volts to the signal processor 24, the transmit/receive control 26 and the frequency and alignment control 30. A second regulator 36 supplied by the filtered 12 volts supplies 5 volts to the transceiver 28.

The transceiver 28 includes a transmit unit 40 and a receive unit 42, each comprising a monolithic microwave integrated circuit. Transmit and receive antennae 44 and 46, designed specifically to cover zone 16a (or 20a), are coupled to first ports of the transmit unit 40 and the receive unit respectively. Transmit and receive antennae 48 and 50, designed specifically to cover zone 16b (or 20b), are coupled to second ports of the transmit unit 40 and the receive unit 42, respectively. In addition, each unit has a third port coupled to the frequency and alignment control 30. The transmit/receive control 26, under management of the signal processor, can select either of the first, second or third ports to be active to cover either zone or to effect calibration. When the calibration impedance is utilized in the control 30, the microwave energy circulates from the transmit unit through the impedance to the receive unit. Thus it will be recognized that microwave energy emitted by the side antenna 44 will be effectively terminated by switching the energy to the control 30. Another way of terminating the transmission of the microwave energy is to turn off the 5 volt supply to the units 40 and 42 at the second regulator 36.

The signal processor 24 includes a digital signal processor (DSP) 52 connected to a microprocessor (µP) 54. A reverse signal and a pulsed speed signal are inputs to the microprocessor and .other vehicle interfaces are coupled via buffers 56 to the microprocessor. A feedback line 58 carries a signal representing transceiver power from the regulator 36 to a port of the microprocessor 54. A power enable line 60 from a port of the microprocessor 54 to the regulator 36 allows the microprocessor to turn the transceiver on and off.

The speed signal comprises pulses at a frequency proportional to vehicle speed and may be available from either an onboard engine control module and/or anti-lock brake wheel speed sensors. Preferably the speed signal supplies about 4000 pulses per mile. The microprocessor counts vehicle speed pulses over time and translates this into platform speed. Target discrimination algorithms use the speed information in determining whether a detected object is a hazard. This is discussed in detail in U.S. patent application Ser. No. 08/372,259, filed Jan. 13, 1995 entitled "Blind-Zone Target Discrimination Method and System for Road Vehicle Radar", assigned to the assignee of this invention and which is incorporated herein by reference. The DSP 52 does the radar calculations involving targets within the system zone of coverage. The DSP measures range rate of each target, estimates range in "X" and "Y" directions from the antennae, and supplies a time stamp. This information is sent to the microprocessor 54 which, knowing platform speed, compares data within the structure of the target discrimination algorithms and makes a decision to report "valid" targets to the operator or to not report targets which are of little interest to the operator.

The microprocessor is programmed to turn off the side detection radar transmission when the vehicle is stationary for a predetermined time, say, one to fifteen minutes, or when the vehicle is in reverse gear. Rear detection radar transmission is only active when the vehicle is in reverse. When rear object detection is not used, the reverse signal is still useful to disable the side transmission.

Figure 3:
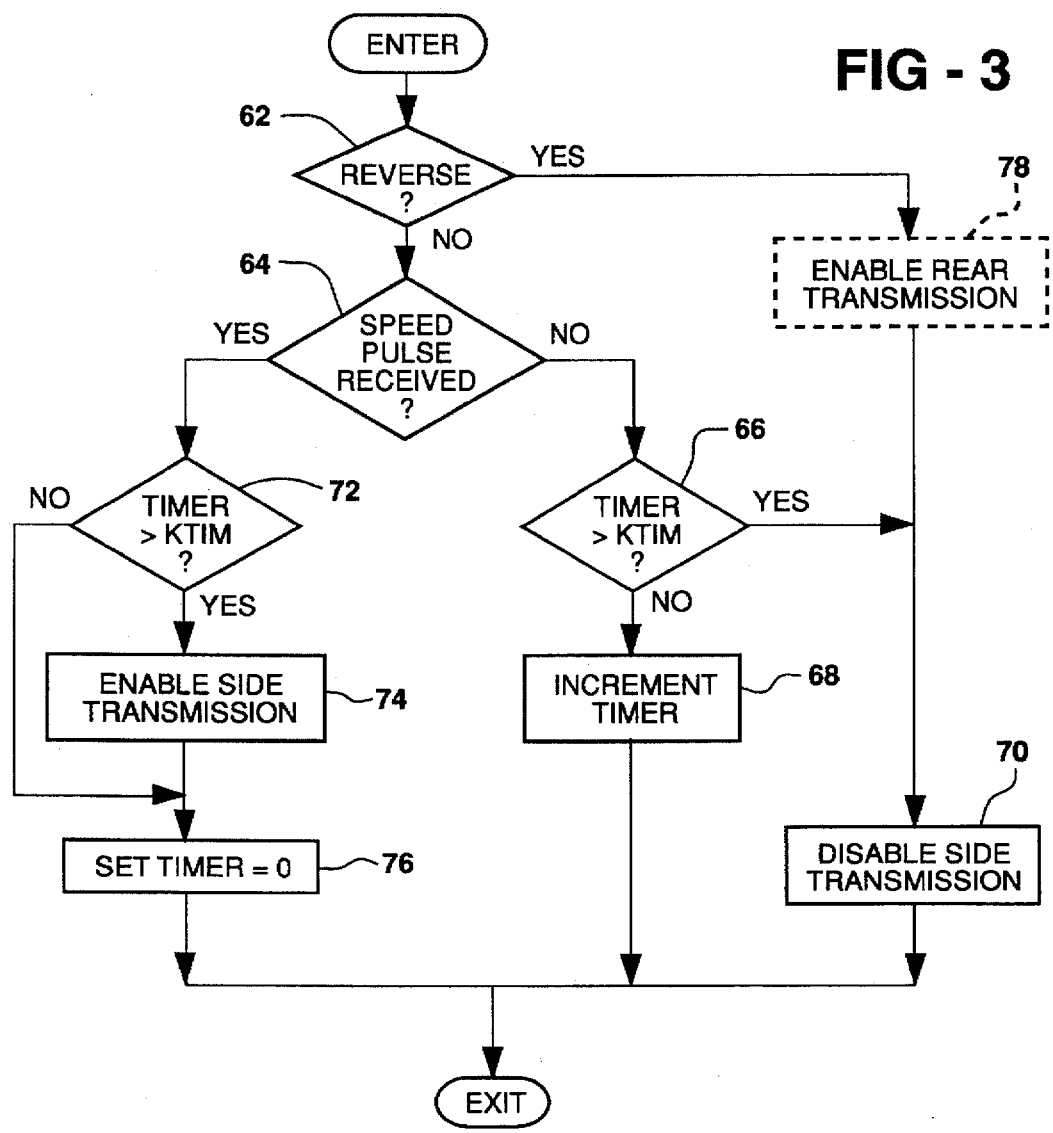
FIG. 3 is a flow chart representing software functions employed in the system of FIG. 2.

The program for terminating transmission is depicted in the flow chart of FIG. 3, wherein the functional description of each block in the chart is accompanied by a number in angle brackets <nn>which corresponds to the reference number of the block. The program checks for a reverse signal <62>and if there is none, it checks for a speed pulse since the last execution loop of the program <64>. If no pulse is received, a timer is compared to a threshold KTIM <66>and if the time is less than the threshold the timer is incremented <68>. If the time is greater than the threshold, side transmission is disabled <70>. Where the speed pulse is received <64>and the timer is greater than the threshold <72>, it is indicated that the transmission had been disabled but now the vehicle is moving and the transmission should be turned on. Thus the transmission is enabled <74>and the timer is set to zero <76>. If the timer is less than the threshold <72>the timer is set to zero <76>. In the case where the reverse signal is present <62>the rear transmission is enabled <78>. This will have the effect of rerouting the microwave energy from the side antenna to the rear and thus includes the disabling step 70. Where there is no rear detection, the presence of the reverse signal will cause the side transmission to be disabled <70>.

One mode of disabling side transmission (and any transmission) is for the microprocessor to remove the enable signal from line 60. Then the regulator will remove power from the transmit unit 40 and receive unit 42. This has the advantage of reducing energy usage and extending product reliability. Of course the transmission would be enabled by reapplying the enable signal.

Another mode of disabling side transmission is to command the transmit/receive control 26 to route the microwave energy to the frequency and alignment control 30. This has the advantage of maintaining the units 40 and 42 in operation at a stable operating temperature and maintains the ability to quickly resume transmission.

The threshold time KTIM may be chosen from a range of several seconds to several minutes. The chief purpose of the system is to avoid long periods of transmission when the vehicle is parked, idling at a rest stop or when stopped in traffic for a substantial time. On the other hand, short stoppages such as waiting for a traffic light do not warrant interruption of the radar emission.

The embodiments of the invention in which an exclusive property or privilege is claimed are defined as follows:

1. In a vehicle having a radar system for detecting a possible collision, the method of radar power control comprising the steps of:

energizing the radar system to transmit and receive radar signals;

sensing a vehicle speed signal;

determining from the speed signal when the vehicle is stationary for a prescribed period; and terminating radar transmission power when the vehicle is stationary for the prescribed period.

2. The invention as defined in claim 1 wherein the speed signal is a series of pulses representing vehicle motion and wherein:

the step of determining when the vehicle is stationary for a prescribed period includes determining when the pulses are absent;

measuring the time of absence of pulses; and comparing the measured time to the prescribed period.

3. The invention as defined in claim 1 further including the step of:

reenergizing the radar transmission upon vehicle movement occurring after the radar transmission power has been terminated.

4. The invention as defined in claim 3 wherein the speed signal comprises a pulse for each increment of vehicle movement and wherein:

the step of determining from the speed signal when the vehicle is stationary includes timing the period following the most recent pulse, and determining that the vehicle is stationary for a prescribed period when the timed period reaches a set threshold; and determining vehicle movement after termination of transmission by detecting a new pulse.

5. The invention as defined in claim 1 wherein the radar system has first and second transmitting antennae for transmitting in different directions or zones, and including the steps of:

producing transmission power;

transmitting power in a first direction by routing the power to the first antenna; and terminating transmission power in the first direction by routing the power to the second antenna.

6. In a vehicle having a speed signal generator, an automotive radar system for sensing nearby objects wherein radar transmission is disabled when the vehicle is stopped comprising:

a transceiver for transmitting and receiving radar signals;

a circuit coupled to the transceiver for enabling and disabling radar transmission;

a signal processor coupled to the circuit for controlling the enabling and disabling of transmission;

the signal processor being coupled to a vehicle speed signal and having control means for detecting stoppage of the vehicle and for disabling transmission of signals after a prescribed period of vehicle stoppage.

7. The invention as defined in claim 6 wherein the circuit coupled to the transceiver for enabling and disabling radar transmission comprises means for supplying power to the transceiver, wherein the signal processor causes power to be removed to disable transmission.

8. The invention as defined in claim 6 wherein the circuit coupled to the transceiver for enabling and disabling radar transmission comprises a voltage regulator for supplying power to transmitting and receiving portions of the transceiver.

9. The invention as defined in claim 6 wherein the speed signal is a series of pulses representing vehicle motion and wherein:

the control means further is programmed for measuring the time lapse following the last speed signal pulse and for commanding termination of radar transmission when the time lapse attains a threshold.

10. The invention as defined in claim 9 wherein the control means is further programmed for commanding restoration of radar transmission when a new speed signal pulse is received.

11. The invention as defined in claim 6 wherein the transceiver includes:

a calibration impedance; and means for routing transmitter power through the calibration impedance to disable radar transmission.

12. The invention as defined in claim 6 wherein:

transmitter power is coupled from a transmitter unit to an antenna for radar transmission;

the transceiver includes means for routing transmitter power selectively to either the antenna or an alternate path;

the circuit coupled to the transceiver for enabling and disabling radar transmission comprises a control coupled between the signal processor and the transceiver for selecting the routing of transmitter power.

13. The invention as defined in claim 6 wherein:

transmitter power is selectively coupled from a transmitter unit to a first antenna for radar transmission in a first zone and to a second antenna for radar transmission in a second zone;

the transceiver includes means for routing transmitter power selectively to either the first antenna or the second antenna; and the circuit coupled to the transceiver for enabling and disabling radar transmission comprises a control coupled between the signal processor and the transceiver for selecting the routing of transmitter power to enable and disable transmission from the first antenna.

* * * * *